(12) United States Patent
O'Toole et al.

(10) Patent No.: US 6,913,400 B2
(45) Date of Patent: Jul. 5, 2005

(54) OPTOELECTRIC MODULE FOR MULTI-FIBER ARRAYS

(75) Inventors: Michael M. O'Toole, San Jose, CA (US); Bradley S. Levin, Newark, CA (US); Philip J. Edwards, San Jose, CA (US); Lee L. Xu, Cupertino, CA (US); Joseph J. Vandenberg, West Covina, CA (US); Joseph Markham, Hillsborough, NJ (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/901,293

(22) Filed: Jul. 9, 2001

(65) Prior Publication Data

US 2003/0138219 A1 Jul. 24, 2003

(Under 37 CFR 1.47)

Related U.S. Application Data

(63) Continuation of application No. PCT/US00/30525, filed on Nov. 3, 2000.

(51) Int. Cl.[7] .............................................. G02B 6/36
(52) U.S. Cl. .................................... 385/89; 385/88
(58) Field of Search ............................. 385/33, 88–93

(56) References Cited

U.S. PATENT DOCUMENTS

| | | | | |
|---|---|---|---|---|
| 4,075,477 | A | * | 2/1978 | Hanson .................. 250/227.24 |
| 4,186,994 | A | * | 2/1980 | Denkin et al. ................. 385/90 |
| 4,389,655 | A | | 6/1983 | Baues .......................... 346/107 |
| 4,732,446 | A | * | 3/1988 | Gipson et al. ................. 385/24 |
| 4,897,711 | A | * | 1/1990 | Blonder et al. ................ 257/48 |
| 5,487,124 | A | * | 1/1996 | Bowen et al. ................. 385/93 |
| 5,515,468 | A | | 5/1996 | DeAndrea et al. ............ 385/88 |
| 5,657,409 | A | * | 8/1997 | Raskin et al. .................. 385/92 |
| 5,708,743 | A | | 1/1998 | DeAndrea et al. ............ 385/88 |
| 5,740,293 | A | * | 4/1998 | Van Roemburg et al. ..... 385/92 |
| 5,901,262 | A | | 5/1999 | Kobayashi et al. ........... 385/89 |
| 6,229,712 | B1 | * | 5/2001 | Munoz-Bustamante et al. ......................... 361/783 |
| 6,253,004 | B1 | * | 6/2001 | Lee et al. ..................... 385/31 |
| 6,394,664 | B1 | * | 5/2002 | Isaksson ....................... 385/88 |

(Continued)

FOREIGN PATENT DOCUMENTS

EP          0 901 023 A2      3/1999      ...................... 6/12

OTHER PUBLICATIONS

Schematic drawing of Hewlett–Packard (Agilent) MTRJ Transceiver prepared by Stephen J. Driscoll on May 23, 2001.

PCT International Search Report dated Nov. 14, 2001, issued in connection with International Application No. PCT/US00/30525.

*Primary Examiner*—Akm Enayet Ullah
*Assistant Examiner*—Jennifer Doan

(57) ABSTRACT

An optoelectric module adapted to cooperate with a multi-fiber array by displacing a plurality of OEDs from the fiber array at least along the z,y-axes or a combination thereof while maintaining their alignment along either the x-axis of the fiber array, the module comprising: (a) a connector interface adapted to interconnect with a multi-fiber assembly having an x,y array of fibers; (b) a plurality of OEDs for converting between optical and electrical signals; and (c) optical paths wherein each optical path has a first end adapted for optically coupling with a corresponding fiber in an x,y array of fibers and a second end for optically coupling with a corresponding OED, wherein the distance between the second ends of at least two optical paths is greater than the distance between their corresponding first ends and wherein the distance across the second ends along the x-axis is no greater than the distance across the first ends along the x-axis.

46 Claims, 11 Drawing Sheets

U.S. PATENT DOCUMENTS 6,513,992 B2 * 2/2003 Andersen et al. ............. 385/92
6,601,998 B2 * 8/2003 Arsenault et al. ............. 385/88
6,632,030 B2   10/2003 Jiang et al. ................... 385/93

* cited by examiner

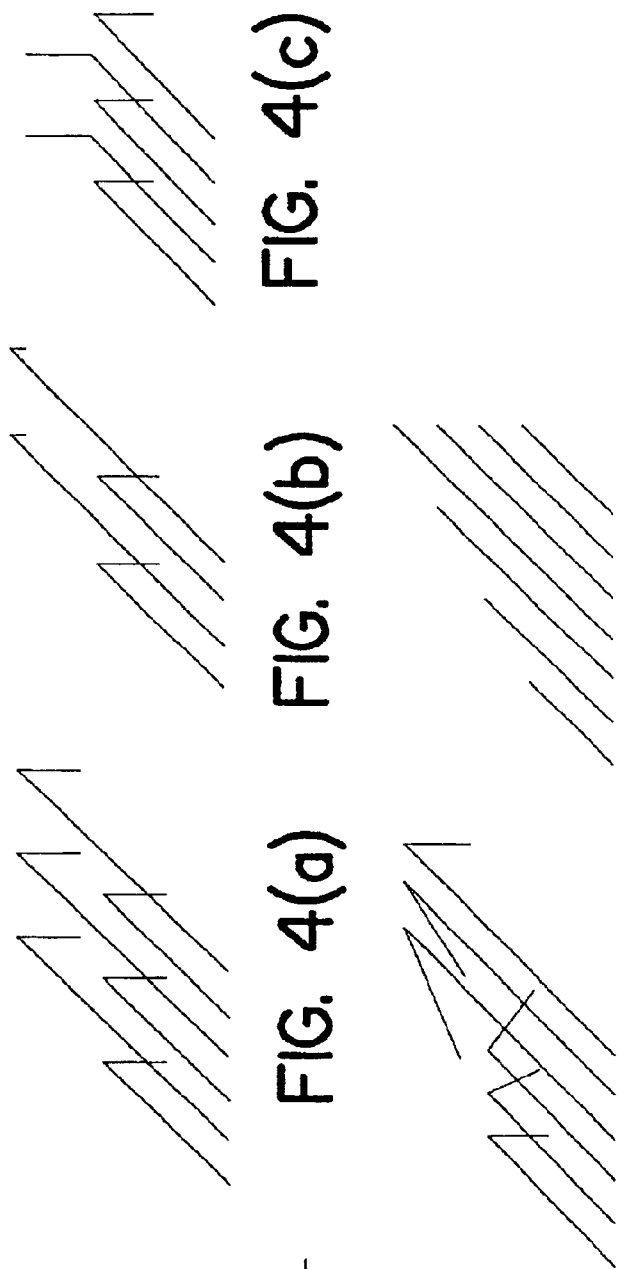
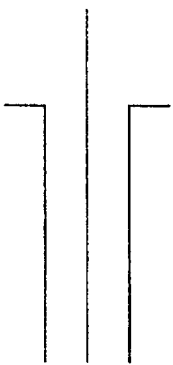
FIG. 4(a)  FIG. 4(b)  FIG. 4(c)
FIG. 4(d)  FIG. 4(e)  FIG. 4(h)
FIG. 4(f)  FIG. 4(g)

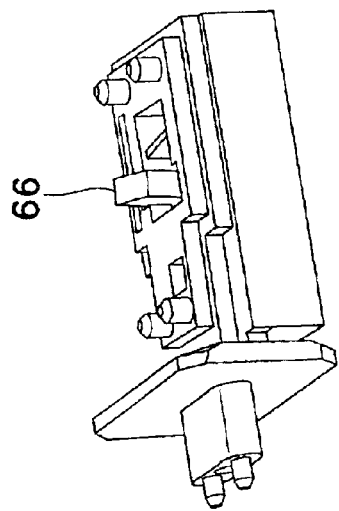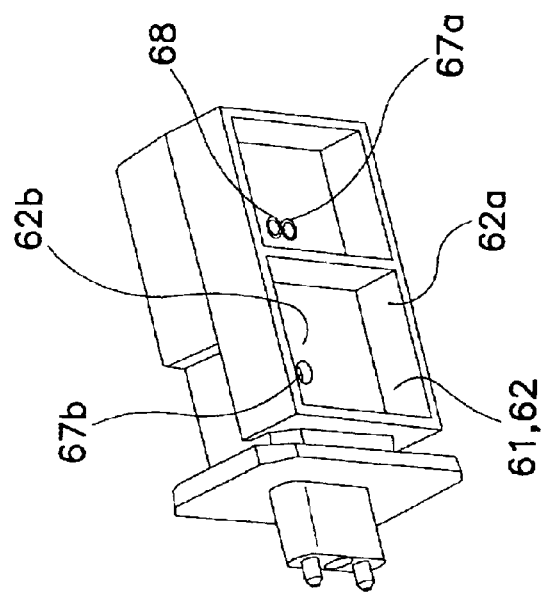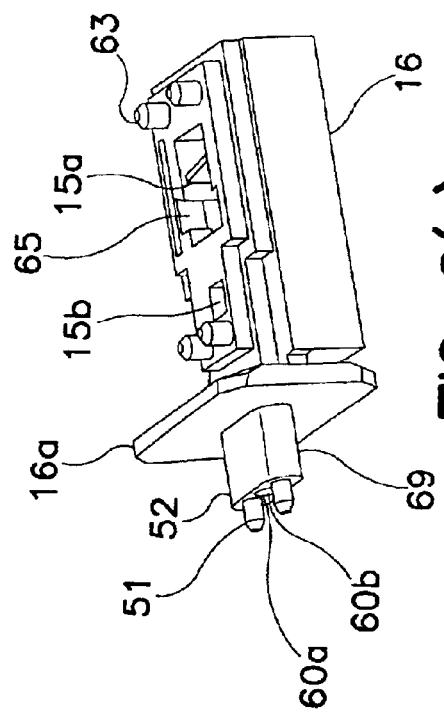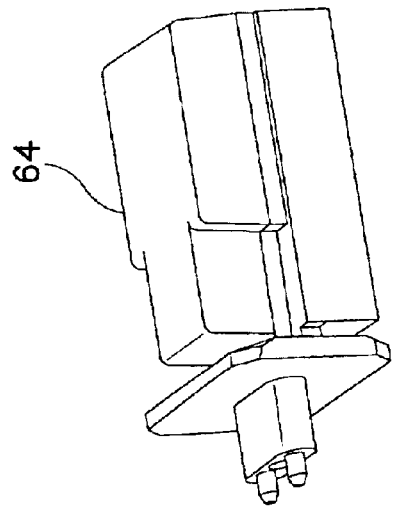

OPTOELECTRIC MODULE FOR MULTI-FIBER ARRAYS

This is a continuation of Application No. PCT/US00/30525, filed on Nov. 3, 2000.

FIELD OF INVENTION

The present invention is related generally to optoelectric devices. More specifically, the present invention relates to optoelectric devices for use with multi-fiber arrays.

BACKGROUND OF THE INVENTION

As technology continues to evolve in telecommunications, optics is playing an ever-increasing role and, in many respects, has become predominant over conventional electrical transmissions. An important subsystem of an optical telecommunication system is the optoelectric interface which converts signals between the optical domain and the electrical domain. Typically, the optoelectric interface comprises some kind of optoelectric device (OED) for either transmitting or receiving optical signals. OEDs are commonly packaged in "TO can" assemblies which comprise a cap and a header assembly. The header assembly can be a hybrid microelectronic assembly which includes the OED plus one or more integrated circuits (ICs) or passive components. The header assembly includes an insulating plate, such as a suitable ceramic submount, on which the ICs and OED are mounted. The insulating plate, in turn, is mounted on a metallic header through which leads extend. Therefore, a TO can comprises an assembly of electrical and mechanical elements involving multiple assembly steps and electrical connections.

In addition to the OED, a typical optoelectric interface comprises a printed circuit board or substrate containing the necessary circuitry to operate the OED, and a connector interface for interfacing with an optical connector of an optical fiber or cable (multiple fibers). A typical optical connector comprises a housing with a ferrule disposed therein. The ferrule is configured to hold one or more fibers in a specific spacial relationship and has an end face which presents the fiber ends in an array. The end face is generally polished to provide for good optical contact with a mating face of the module. The combination of the fiber and optical connector is referred to herein as a "cable assembly".

Generally, the OED, supporting circuitry, substrate and connector interface are packaged into a discrete module, referred to herein as an "opto-electric module" or just "module." Optoelectric modules are generally configured for installation into larger host systems such as routers and computers. The modules are typically installed on host circuit boards within such host systems using conventional installation configurations such as through-pin mounting or pluggable receptacles. Since the modules are configured to interconnect to cable assemblies, the modules are typically positioned near the perimeter of the host system for accessibility and to avoid the need for circuitously routing the fiber through the host system. The desire to minimize the access area required for each module has lead to modules being elongated and rectilinear in shape such that they present an end face having a relatively small area for connection to the cable assembly.

For purposes of illustration, reference is made to the optoelectric module's orientation with respect to the x,y, and z axes in accordance with the Cartesian coordinate system. Unless otherwise indicated, the z axis is the axis along which light enters the module. Recent trends in module design promote configurations in which light enters essentially parallel to the substrate. Therefore, the z-axis will typically be along the length of the elongated modules and the x,y axes will typically define the area of the end face.

The continuing need for miniaturization in the telecommunications field has impacted optoelectric modules in several respects. First, the need to populate the backplane of host systems with as many modules as possible has intensified the need to reduce the modules' x,y area. Indeed, recent trends in industry standards have seen a precipitous reduction in the x,y area of the module and this trend is likely to continue. Recent modules designs which have reduced x,y areas have been termed "small-form factor" designs.

Complicating the desire for small-form factor designs is a competing desire for increasing the number of fibers presented in a single optical connector. The industry is evolving from single fiber ferrules to multi-fiber ferrules containing two or more fibers arranged in an x,y array. The x,y arrays typically are elongated along the x axis and comprise a plurality of columns along the y axis and one or more rows along the x axis. Examples of commonly-used, multi-fiber connectors include the MT-RJ type of connectors which have a single row of two or more fibers and the Lightray MPX™ line of connectors which have one or more rows of one or more fibers. Therefore, the desire for small form factor designs combined with the desire for multi-fiber arrays has lead to the need for modules cable of handling compact multi-fiber arrays also referred to herein as "high-density fiber arrays."

Unfortunately, interfacing with high-density fiber arrays has been problematic, especially with conventional OEDs such as TO cans. More specifically, TO cans tend to be bulky and the space between fibers in high-density arrays tends to be insufficient to accommodate their bulk. One approach for accommodating the tight space requirements of high-density arrays is to employ elaborate light reflecting optics to expand the array along the x axis and thereby increase separation between optical paths (see, e.g, Hewlett Packard MT-RJ transceiver m/n HFBR-5903,2). Although such an approach works for relatively simple fiber arrays, for example, a single row of two fibers, this approach tends to be problematic as the number of fibers increases since the room available for expansion along the x-axis becomes less until there is simply insufficient room to accommodate all the TO cans. Additionally, the complex optics needed to expand the distances along the x-axis for even a two fiber array tend to be expensive and problematic from a manufacturing perspective. Such expense and manufacturing difficulty is expected to increase exponentially as the number of fibers in the array increases.

Aside from expense and manufacturing difficulty, optics associated with increasing separation along the x-axis are particularly susceptible to deformation along the optical paths caused by thermal instability encountered during the module's operation. Specifically, such optics typically comprise molded plastic which tends to expand/contract with thermal changes. If the plastic expands/contracts along the direction of parallel optical paths, no distortion is introduced. On the other hand, if the plastic expand/contracts where the optical paths change direction relative to one another, distortion is introduced. Since optics separating optical paths along the x-axis necessarily define divergent optical paths (non-parallel), distortion will be introduced during expansion/contraction. Additionally, any change in the deformation of the optical assembly imposed during assembly and will tend to affect the divergent optical paths differently. For example, if the optical assembly is twisted lengthwise, one divergent path will be deformed upward while the other path will be deformed downward. Furthermore, the reflective surfaces in the optics are separated by relatively large distances and, thus, any deformation of the optics will tend to be magnified by the distance.

Aside from limiting the number of fibers in dense-fiber arrays, TO cans present other problems which make them undesirable. For example, the cylindrical shape makes them difficult to handle using automated pick and place machinery, and, thus, they are usually integrated into modules by hand which is time-consuming and expensive. Their shape also requires active alignment along the x,y,z axes since a cylinder has no reference surface.

Aside from shortcomings associated with their shape and size, TO cans also tend to have imprecise feedback control. More specifically, a traditional TO can typically samples only a section of light being generated by the semiconductor contained within the can. Consequently, the average power of the transmitted beam can only be approximated from the reflected section. Recently, TO cans with angled windows have been introduced which reflect a portion of the entire beam, but such a configuration requires that very precise alignment of the chip on the header. This adds additional complexity to the manufacture of the TO can, which, in turn, drives up the cost.

Therefore a need exists for a small form factor optical module that can accommodate high-density fiber arrays without complex, error-prone optics and without using traditional TO cans and experiencing the problems associated therewith. The present invention fulfills this need among others.

SUMMARY OF INVENTION

The present invention provides for a small form factor optoelectric module capable of accommodating a high-density fiber array by optically communicating with OEDs using optical paths which diverge from the relatively-close packing of the x,y fiber array of the optical connector, to this end, the optical paths diverge from on another along the z-axis, the y-axis, or a combination of the two, but are otherwise within the x-axis dimension of the fiber array. By diverging along the z,y-axes, the optical paths can be spaced apart to accommodate the OEDs without sacrificing space along the x-axis which tends to be more limited. To achieve this spacing, preferably some kind of light bending is used to change direction of the optical paths within the module such that two or more OEDs are displaced along the y-axis of the X,Y fiber array and are staggered along the z-axes.

Significant advantages have been realized by separating the OEDs along the y,z axes while maintaining their alignment along the x-axis. First, as mentioned above, such a configuration may increase space between the OEDs, and, at the very least, avoids having to optically communicate with the OEDs within the same area as the x,y array of the fiber assembly. Additionally, the configuration does not increase the space required along the x-axis, which, in small form factors designs, tends to limit due to the fact that the fibers typically extend in rows along the x-axis in the multi-fiber array. The configuration of the present invention is particularly advantageous when the OEDs are staggered along the z axis since modules tend to have more flexibility with respect along the z-axis then either the x or y-axes. In other words, since the module is typically elongated along the z-axis, maximum separation can be achieved between OEDs along this axes. Furthermore, by increasing separation, cross talk between the OEDs can be minimized.

In preferred embodiments of the present invention, the optical paths are configured not only to provide sufficient spacing to accommodate OEDs and but also to provide for a robust, dimensionally-tolerant optical assembly. To this end, the optical paths are configured to be parallel along the x,z or y,z planes for a substantial portion of their length. Parallel optical paths are preferred due to the tolerance of dimensional fluctuations along the optical paths caused by, for example, thermal changes during operation or mechanical stress during assembly. Generally, parallel optical paths will respond similarly to dimensional changes such that there is little relative change.

Preferably, the optical paths are configured such that the operative axis of the OEDs are non-axial to the fibers of the x,y array. For example, the OEDs may be offset along the y-axis from the x,y fiber array. By optically communicating with OEDs which are disposed in this fashion, the optical paths are not arranged to accommodate the OEDs. In other words, the OEDs are located outside the region where the optics are located, which tends to be axial to the fibers in the x,y fiber array. By physically segregating the optics and the OEDs, the optics may be packaged in a subassembly. In a preferred embodiment, the optics are packaged in a unitary structure of molded optically-clear plastic referred to herein as the "optical block.".

The optical block of the present invention can be used to form an optical subassembly in which all critical optical alignments are contained. To this end, aside from defining optical paths, the optical block preferably comprises alignment features on one end to align the optical block with an optical connector, and receptacles on the other end to receive and align the OEDs. Such an optical subassembly therefore can be handled as a component part which eases assembly of the module not only by eliminating optical alignment steps, but also by providing a robust component suitable for automated handling.

In addition to providing an optically-aligned subassembly which contains all critical optical alignments, improved optical alignment can be achieved by minimizing or reducing stresses imposed along the optical paths during the manufacturing process. Prior art manufacturing processes of optoelectric modules frequently distort established optical alignments by imposing mechanical stresses on the various components which define the optical paths and optical alignments. Therefore, in a preferred embodiment of the present invention, an assembly process is used which minimizes the stresses imposed the optically-sensitive components.

The innovation of light bending in parallel optics to accommodate OEDs alleviates, in large part, the concerns surrounding the bulkiness of TO cans, although it does not address the shortcomings of laser feedback in the TO cans. Furthermore, attempting to sample the entire beam is rendered more complex in parallel optics because there is very little space between the parallel optical paths. Additionally, as mentioned above, the optical paths preferably are defined by an optical block which would seem to pose a barrier to sampling the light traveling along the optical paths within. The present invention, however, provides for monitoring the output of an OED, not by sampling a section of the transmitted light in the OED, but rather by reflecting a portion of the entire beam propagating along an optical path within the optical block. In other words, the present invention provides for an optical block having which accommodates a partially-reflective surface that reflects a portion of the transmitted light to a monitor.

The feedback approach of the present invention offers several key advantages. For example, since a portion of the entire beam is reflected back to the monitor, average power can be measured precisely and there is no need to approximate as in prior art devices. Furthermore, in a preferred embodiment, the light is reflected along the same plane as the transmitted light and therefore is able to use the same reflective surface that the transmitted light uses to change direction. Additionally, since the reflected light is being directed to a photo diode, which typically has a relatively large surface area, there is generally a great deal of tolerance in the placement of the partially-reflective surface. And finally, the optical block of the present invention can be modified to accommodate the feedback system of the present invention with very little effort and expense. Specifically, all that is needed is a cavity angled at a certain degree to avoid reflecting the light along the same axis as the transmitted light. The mirror or partially-reflective surface that is inserted into the cavity is inexpensive flat glass coated in conventional ways. Therefore, in addition to accommodating the light bending in the parallel optics of the present invention, the feedback approach of the present invention also offers higher quality, greatest simplicity and lower cost then comparable feedback systems used in traditional TO cans.

Accordingly, one aspect of the invention is a module adapted to cooperate with a multi-fiber array by displacing a plurality of OEDs from the fiber array at least along the z,y, axes or a combination thereof while maintaining their alignment along either the x-axis of the fiber array. In a preferred embodiment, the module comprises: (a) a connector interface adapted to interconnect with a multi-fiber assembly having an x,y array of fibers; (b) a plurality of OEDs for converting between optical and electrical signals; and (c) optical paths wherein each optical path has a first end adapted for optically coupling with a corresponding fiber in an x,y array of fibers and a second end for optically coupling with a corresponding OED, wherein the distance between the second ends of at least two optical paths is greater than the distance between their corresponding first ends and wherein the distance across the second ends along the x-axis is no greater than the distance across the first ends along the x-axis.

Anther aspect of the present invention is an optical subassembly in which all critical optical alignments are contained. In a preferred embodiment, the optical subassembly comprising: (a) a unitary structure of an optically-clear moldable material comprising at least the following features: (i) a plurality of first lenses adapted for interfacing with a multi-fiber array of a connector assembly, each first lens corresponding to a fiber in the multi-fiber array; (ii) a plurality of second lenses adapted to cooperate optically with the OEDs, wherein each second lens is optically coupled to a first lens along an optical path to define the plurality of optical paths; (iii) at least one reflective surface disposed along one or more optical paths to alter the direction of the optical paths, wherein the optical paths are parallel between the first lens and the reflective surface; (iv) a plurality of OED receptacles for receiving the OEDs, each OED receptacle including one of the second lenses; and (v) at least one alignment member for aligning each fiber end of a multi-fiber array with a first lens; and (b) a plurality of OEDs mounted in the OED receptacles, each OED being optically coupled to one of the second lenses.

Yet another aspect of the present invention is a feedback mechanism for an OED that samples the entire transmitted beam and that is suitable for parallel optics. In a preferred embodiment, the feedback mechanism comprises: (a) an optical assembly defining a plurality of optical paths, at least one of the optical paths being a transmitting optical path which extends from a light-emitting component of an OED to a cable assembly interface; and (b) at least one partially-reflective surface disposed across the transmitting optical path to reflect a portion of light transmitted by the light-emitting OED, wherein the partially-reflective surface is at an angle to the transmitting optical path such that the optical path of the reflected portion of light is not coaxial to the transmitting optical path and is incident upon a monitor for controlling the output of the light-emitting OED. Preferably, the optical assembly is a unitary structure of an optically-clear moldable material having a cavity for receiving the partially-reflective surface. The partially-reflective surface preferably is a piece of coated flat glass.

Still another aspect of the present invention is an assembly method which avoids distorting critical optical alignments during assembly. In a preferred embodiment, the method comprises: (a) providing an optical assembly containing substantially all of the optical alignments from a cable assembly interface to at least one OED including the optical alignment of the OED; (b) assembling the module at least to the extend that a circuit board to which the OED is to be connected is held rigidly in relation to the optical assembly; and (c) after step (b), electrically connecting the OED to the circuit board.

BRIEF DESCRIPTION OF DRAWINGS

FIGS. 4(a)–(h) are schematic representations of possible optical paths that may be defined in the optical coupler of the present invention;

FIGS. 6(a)–(d) are perspective views of a preferred embodiment of the optical coupling, i.e., the optical block;

DETAILED DESCRIPTION OF PREFERRED EMBODIMENT

Module

Figure 1:
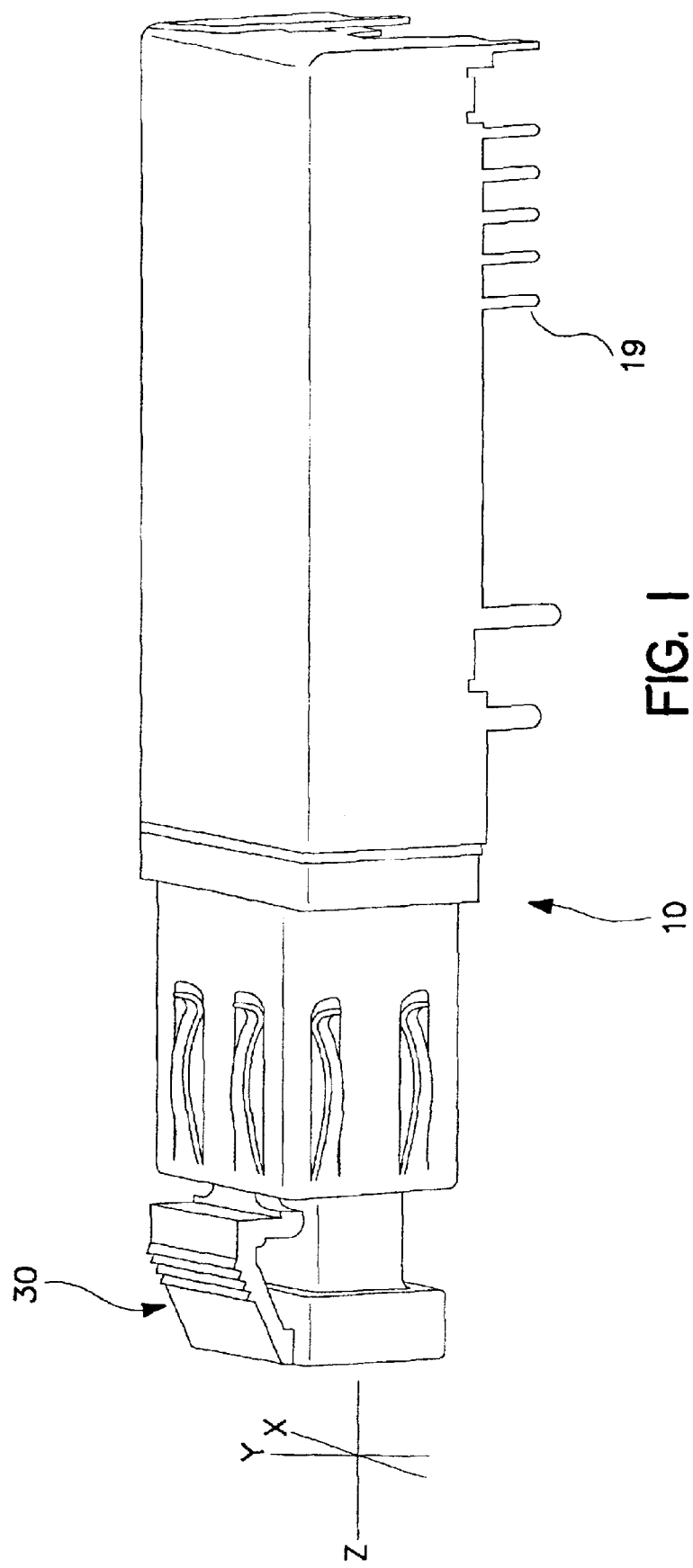
FIG. 1 illustrates an optoelectric module of the present invention with an optical connector (partially shown) interengaged therewith.

Referring to FIG. 1, a perspective view of the optoelectric module of the present invention is shown. For purposes of illustration, throughout this disclosure, reference is made to the x, y and z axes of the module as indicated in FIG. 1. Unless otherwise indicated, the z axis is the axis along which light enters the module. By convention, the x-axis is generally horizontal while the y-axis is generally vertical. It will be apparent to one skilled in the art, however, that such conventions are not absolute and the orientation with respect to the x and y axes can be altered, for example, by simply rotating one's perspective of the module. Accordingly, the present invention should not be interpreted by a stringent adherence to an arbitrary convention, but rather the orientation scheme recited herein should be applied consistently once the axes of the module are established.

The module 10 is configured to be mounted in a variety of host systems including for example, routers, computers, switches, bridges, and I/O cards. In general, the module may be used in any application requiring an interface between electrical and optical signals.

Module 10 interfaces with a host system via through pins 19. Electrically interfacing module 10 with a host system is well known in the art and is not discussed in greater detail herein. Although the module depicted in FIG. 1 has pins for through-hole mounting, it should be understood that the module of the present invention may be configured to interconnect with a host system in various ways. For example, the module may be configured for pluggable mounting or island mounting, or even integral construction with the host system. Indeed, it is contemplated that the module of the present invention may not be necessarily a discrete module, but rather an arrangement of components and/or subassemblies individually mounted in a host system to provide the functionality described herein. Therefore, the term "module" is used broadly to describe a compilation or arrangement of certain components and should not be used to limit the scope of the present invention.

Figure 3:
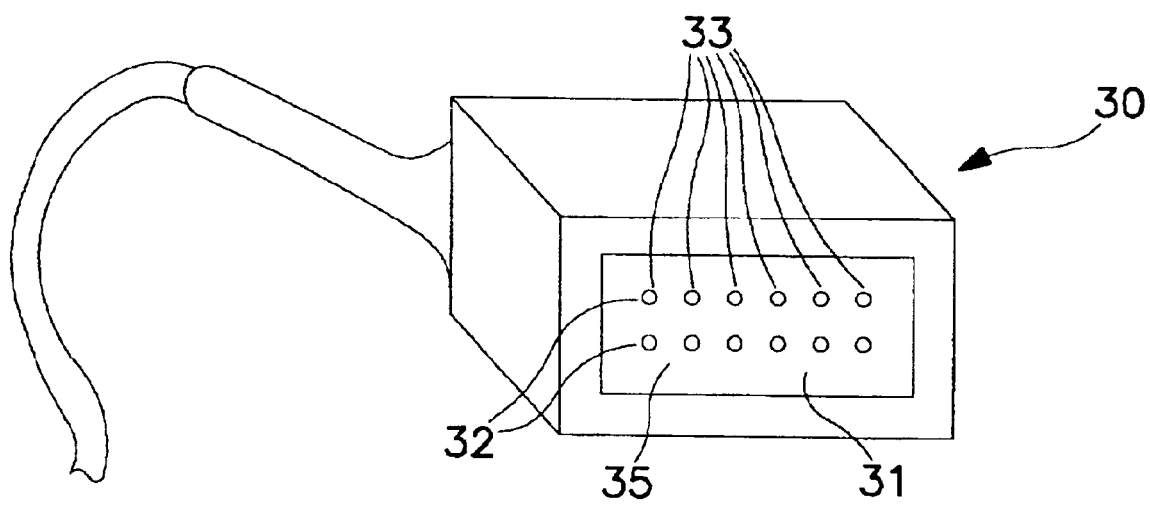
FIG. 3 is a schematic representation of a connector assembly having a multi-fiber array.

The module 10 of the present invention interfaces optically by cooperating with a cable assembly 30 having a multi-fiber x,y array 31 as shown schematically in FIG. 3. The x,y array 31 comprises multiple columns 33 of fibers in one or more rows 32. As shown, the columns 33 are aligned along the y axis while the rows 32 are aligned along the x axis. It should be understood that characterizing the multi-fiber array as rows and columns along the x, y axes respectively is for illustrative purposes and should not be construed to limit the scope of the present invention. Typically, these fibers are held in spacial relationship to one another using a ferrule 35. The end of the ferrule is polished to present the ends of the fibers in such a way that optical coupling therewith can be achieved using conventional techniques.

Figure 2:
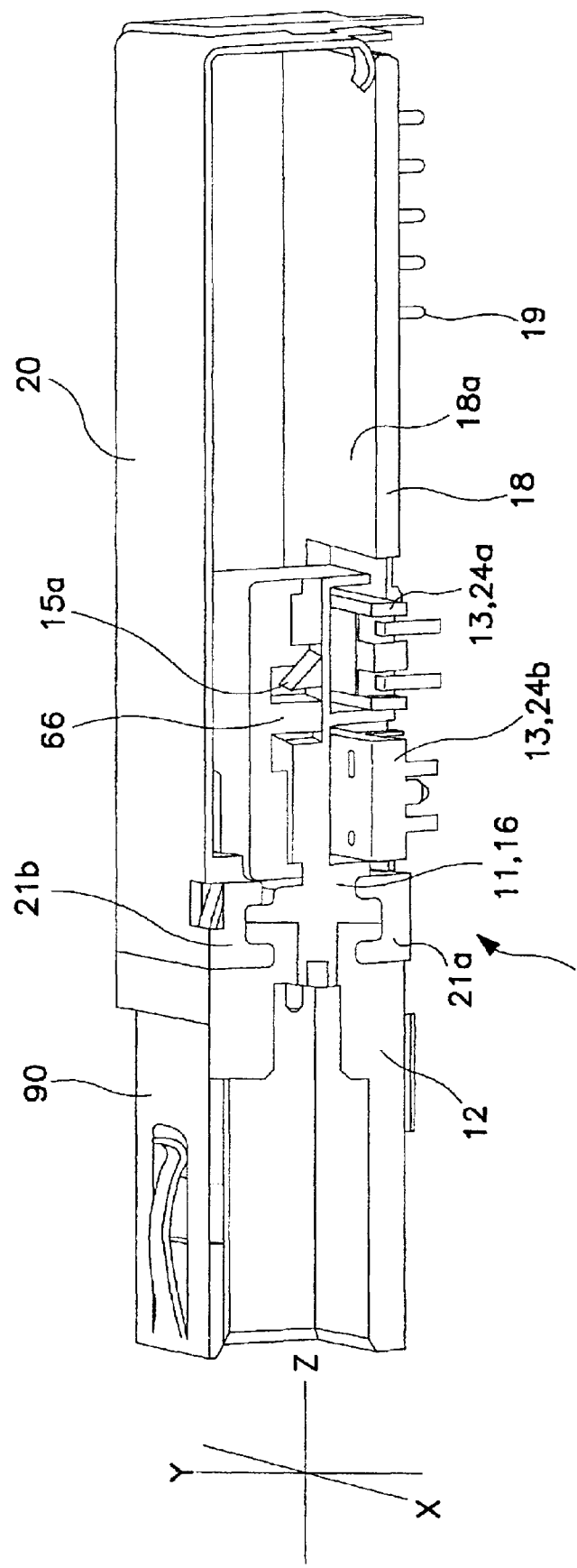
FIG. 2 is a cross sectional view along the Z axis of the optoelectric module shown in FIG. 1 without the optical connector.

Referring to FIG. 2, a cross section of the module 10 along the z axis is shown. The module comprises (1) a connector interface 12 adapted to interconnect with a multi-fiber array cable assembly, (2) a plurality of optoelectric devices (OEDs) 13 for converting between optical and electrical signals; and (3) optical paths within an optical coupler 11, wherein each optical path has a first end adapted for optically coupling with a corresponding fiber in the multi-fiber array, and a second end for optically coupling with a corresponding OED. Preferably, the distance between the second ends of at least two optical paths is greater than the distance between their corresponding first ends and, preferably, the distance across the second ends along the x-axis is not substantially greater than the distance across the first ends along the x-axis. Each of these elements is described in greater detail below.

1. Connector Interface

The connector interface 12 may be any conventional device suitable for cooperating with a multi-fiber array presented in cable assemblies. Suitable interfaces include, for example, adapters/jacks to receive and connect to plugs, plugs to be received in adapters/jacks, and even fiber stubs for fusing/connection with fibers of a cable assembly. Preferably, the connector interface comprises a mechanism that cooperates with the cable assembly to hold the cable assembly secure to the module. Examples of such connector interfaces include adapters for the MT-RJ style connectors and the Lightray MPX™ line of connectors offered by Tyco Electronics Corporation (Harrisburg, Pa.). The connector interface 12 depicted in FIG. 2 is an adapter interface for an MT-RJ style connector.

Figure 8B:
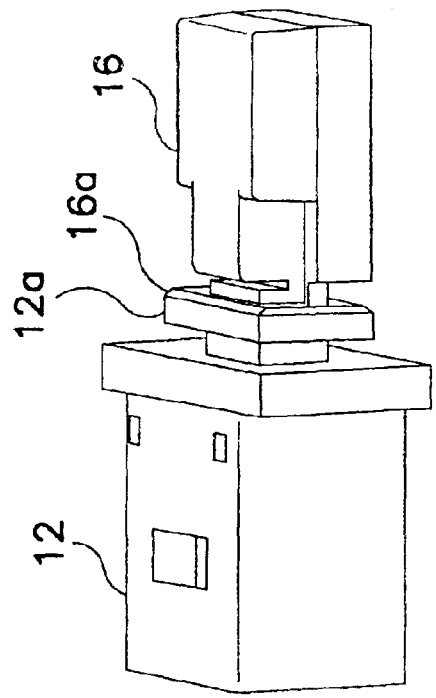
FIGS. 8(a)–(n) are perspective views of the optoelectric module of FIG. 1 during various stages of assembly.
Figure 8D:
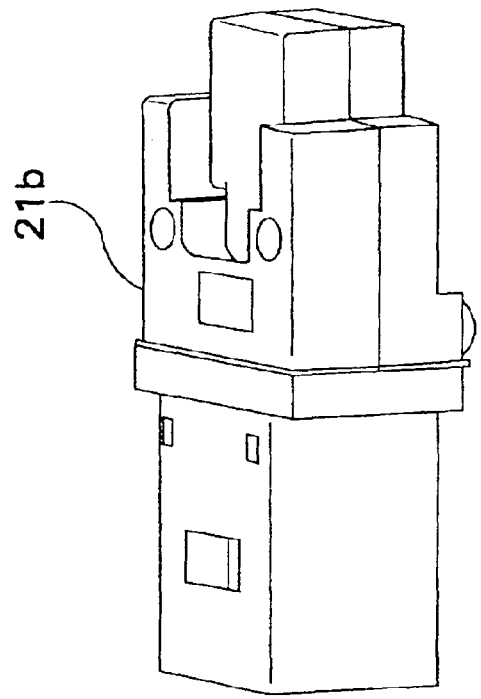
Figure 8A:
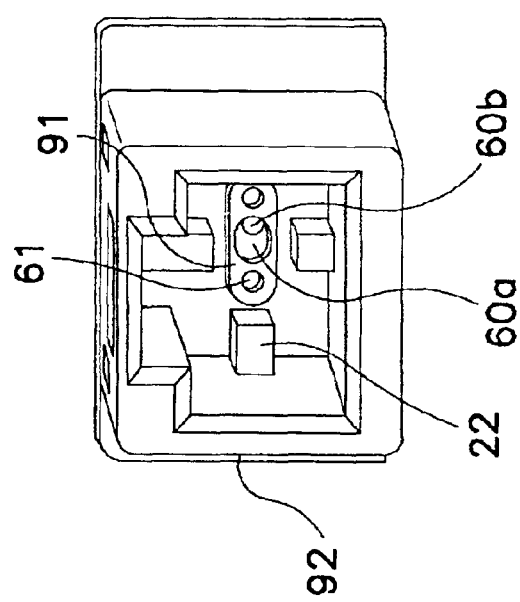
Figure 8C:
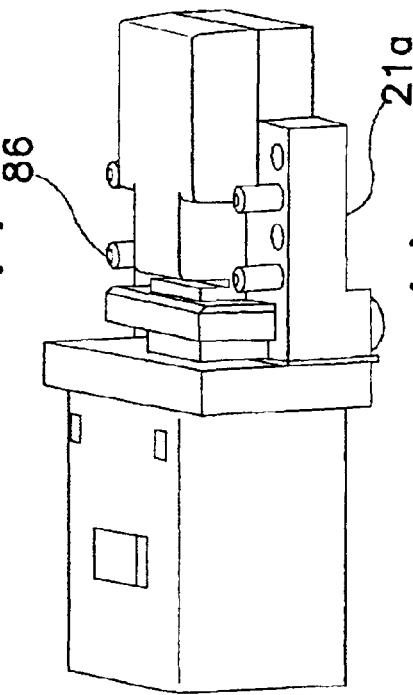

A front view of the connector interface 12 is shown in FIG. 8a. The connector interface 12 comprises 92 a housing defining an opening and a cavity to receive an optical connector (not shown). Preferably, castellation members 22 extend inward from sides of the housing 92 to provide coarse alignment of the optical connector with respect to optical block 16 described below. The housing also has an orifice 91 adapted to receive an extension portion 52 of the optical block 16 which provides a form fit between housing and crushing ribs 69. The connection between the optical block 16 and the connector interface 12 is described in greater detail with respect to FIGS. 6 and 8 and their associated text.

2. Optoelectric Devices

Referring back to FIG. 2, the module 2 of the present invention also comprises a plurality of optoelectric devices 13 optically coupled to the second end of a corresponding optical path for converting between optical and electrical signals. As the term is used herein, "opto-electronic device" or OED refers to a device which converts electrical current to light and/or light to electrical current. The term "light" refers generally to electromagnetic radiation, and preferably to those wavelengths of electromagnetic radiation to which semi-conductive material is, or can be made, sensitive, whether or not such light is actually visible to the unaided eye. Examples of opto-electronic devices include lasers (e.g., vertical cavity surface emitting laser (VCSEL), double channel, planar buried heterostructure (DC-PBH), buried crescent (BC), distributed feedback (DFB), distributed bragg reflector (DBR), etc.), light emitting diodes (LEDs) (e.g. surface emitting LED (SLED), edge emitting LED (ELED), super luminescent diode (SLD), etc.) or photo-diodes (e.g., P Intrinsic N (PIN), avalanche photodiode (APD), etc.). As is understood by those skilled in the art, opto-electronic devices typically include an "active area" or "active surface" which emits light or is sensitive to the impingement of light thereon. As the term is used herein, the "operative axis" of such devices refers to the axis which is about normal to and passes through about the center of such active area or active surface.

With respect to transmitters, preferably the OED 13 comprises a laser chip having a VCSEL and a power monitor, namely, a photodetector. A VCSEL is preferred because it has relatively low cost, uses a surface emission approach which is optically simply, and is capable of being fabricated in larger volumes on semiconductor wafers. More preferably, the OED comprises a ridge VCSEL having formed as a part thereof a vertically integrated PIN photodetector, a vertically integrated MSM photodetector, a laterally integrated photodetector, a separate laterally positioned photodetector, a dual VCSEL and flip chip photodetector, or the like.

Preferably, the OED is manufactured using lead frame technology. It is an advantage of the present invention that the use of a lead frame structure allows for the simultaneous fabrication of a large number of opto-electronic packages, such as transmitters, receivers or transceivers. Similar to conventional electronic integrated circuit processing, a plurality of integrated circuits may be simultaneously attached and wire bonded to the lead frame. In accordance with the known manufacturing techniques, an associated plurality of optical devices are coupled to lead frames and the combination of electronics and optics encapsulated using a molding process (e.g., transfer molding) to form the final packaged assembly. When the molding operation is completed, lead frames may be severed from one another to form a plurality of final package assemblies.

In the module shown in FIG. 2, the OEDs 13 are mounted to the surface 18a of a substrate 18. As the term is used herein, "substrate" refers to an electronic component having electronic circuit elements mounted thereto or forming part thereof. The substrate may include, for example, a plurality of integrated chips. Such chips may represent, for example, a pre-amplifier or post-amplifier and additional electronic circuits. The type and nature of such circuit elements, and the techniques and methods for mounting such elements to the substrate 18 are well known in the art and do not form part of the present invention. In typical embodiments, the substrate 18 comprises a printed circuit board (PCB), printed wiring board (PWB) and/or similar substrates well known in the art. The substrate 18 has connecting pins 20 depending therefrom and is adapted to mate with another substrate (not shown) of the host system. According to preferred embodiments, substrate facilitates a dual-inline package (DIP) adapted to be mounted to the motherboard or some other system board of a host system. Alternatively, rather than pins 20, the substrate 18 may have contacts arranged on its side to facilitate card edge connections. Such an embodiment is preferred for pluggable modules and is well known in the art. In addition to pins and edge contacts, any other known means for interfacing the substrate with the host system may be used within the scope of the present invention.

3. Optical Paths

As mentioned above, the optical paths are configured to afford sufficient separation therebetween to accommodate the OEDs, but preferably not along the x-axis which tends to be more restricted in space than the other two axes as mentioned above. In a preferred embodiment, each optical path comprises a first section which includes the first end and is parallel to the z-axis, and a second section which includes the second end. The first and second sections preferably are not coaxial. In a preferred embodiment, the optical paths are configured such that (a) the distance along the y-axis between the at least two second ends is greater than the distance along the y-axis of their corresponding first ends, or (b) the two second ends are separated by a certain distance along the z-axis, or a combination of (a) and (b) above.

Significant advantages have been realized by separating the OEDs along the y,z axes while maintaining their alignment along the x-axis. First, as mentioned above, such a configuration increases space between the OEDs, and avoids having to communicate optically with the OEDs within the same area as the x,y array of the fiber assembly. Additionally, the configuration does not increase the space required along the x-axis, which, in small form factors designs, tends to be limited due to the fact that the fibers typically extend in rows along the x-axis in the multi-fiber array. The configuration of the present invention is particularly advantageous when the OEDs are staggered along the axis since modules tend to have more flexibility with respect along the z-axis then either the x or y-axes. In other words, since the module is typically elongated along the z-axis, maximum separation can be achieved between OEDs along this axes. Furthermore, by increasing the separation, cross talk between the OEDs can be minimized.

Preferably, the second sections are not parallel to the z-axis such that the OEDs are displaced from the x,y fiber array along the y-axis and their operative axis is no longer parallel to the z-axis. More preferably, a portion of the second sections is substantially perpendicular to the z and x axes and substantially parallel to the y-axis. By optically communicating with OEDs which are disposed in this fashion, the optical paths and lenses need not be arranged to accommodate the OEDs. In other words, the OEDs are located outside the region where the optics are located. This region tends to be aligned along the z-axis of the fibers in the x,y fiber arrays. By physically segregating the optics and the OEDs, the optics may be packaged in a subassembly, and, in a preferred embodiment, the optics are packaged in a unitary, molded optical block In preferred embodiments of the present invention, the optical paths are configured not only to provide sufficient spacing to accommodate OEDs and but also to provide for a robust, dimensionally-tolerant optical assembly. To this end, the optical paths are configured to be parallel along the x,z or y,z planes for a substantial portion of their length. Parallel optical paths are preferred due to their tolerance of dimensional fluctuations caused by, for example, thermal change or mechanical stress. Generally, parallel paths will respond similarly to dimensional changes such that there is little relative change therebetween.

The optical coupling defines a number of optical paths which may have various configuration, examples of which are illustrated schematically in FIGS. 4(a)–(h). It should be understood that the optical paths depicted in these figures are depicted schematically and references to lenses and reflective surfaces have not been included. The configuration of lenses and reflective surface needed to effect the optical paths as depicted would be well known to one skilled in the art. Furthermore, a detailed example of a preferred arrangement of lenses and reflective surfaces is described in detailed with respect to FIGS. 7(a)–(c).

Each optical path depicted in FIGS. 4(a)–(h) has a first end, for optically coupling with a corresponding fiber in the x,y array. For illustrative purposes, the first end is consistently represented as the left most end of the optical path. It should be understood that the spacial relationship of the first ends is such that each first end is aligned with a particular fiber end in the x,y fiber array. Each optical path also comprises a second end for optically coupling with a corresponding OED, the second end is consistently depicted as the right most end of the optical path.

FIGS. 4a through 4e show optical paths for a single row x,y array such as those found in an MT-RJ-type connector assembly. FIG. 4a depicts an embodiment in which the parallel optical paths are bent at different points along the z axis such that the distance between the second ends of adjacent optical paths is increased along the z axis. In FIG. 4b, every other optical path is bent in the y,z plane while the optical paths in between extend straight along the z axis such that distance between the second ends of adjacent optical paths is increased with respect to both the y axis and the z axis. In FIG. 4c, the optical paths are alternately bent in opposite directions along the y axis such that the distance between the second ends is increased along the y axis. In FIG. 4d, one group of optical paths is bent along the x, y plane at one point along the z-axis while another group of optical paths is bent along the x,y plane at another point along the z-axis. This way, the distance between the second ends is increased along the x axis although overall the optical paths do not fan out along the x axis beyond the x,y array. FIG. 4e depicts optical paths wherein the second ends are staggered along the z axis such that the distance between the second ends of adjacent optical paths is increased along the z-axis.

Regarding FIGS. 4f through 4h, embodiments showing multiple rows of fibers in the x,y array are shown. Specifically, FIG. 4f depicts two rows of optical paths in which one row is bent in one direction along the y axis while the other row is bent in the opposite direction along the y axis such that the distance between the second ends of the first and second rows is increased along the y axis. FIG. 4g shows an embodiment where two rows of optical paths are bent in the same direction along the y axis although one row extends further down the z axis then the other such that the distance between the second ends is increased along the z axis. FIG. 4h shows an embodiment of three rows of optical paths in which the top and bottom rows are bent in opposite directions along the y axis while the middle row extends further along the z axis such that the distance between the second ends of the optical paths is increased along the y and z axes.

It should be understood that the optical path configurations depicted in FIG. 4 are not exhaustive and that many other optical path configurations are possible within the scope of the present invention. For example, it is anticipated that different features of the various optical path configurations shown may be interchanged to create numerous other combinations.

Optically-Aligned Subassembly

Given the complexities associated with parallel optical paths of the present invention, particularly with respect to the preferred embodiments which involve relatively long optical paths and a preference for light bending, maintaining optical alignment of the various component along the optical path is of critical importance. To this end, in a preferred embodiment, an optically-aligned subassembly is used in conjunction with a preferred assembly method to maintain critical optical alignments and to minimize stress along the optical paths. The concept behind the optically-aligned subassembly is to provide a robust package of all the components which effect the optical coupling from the fiber assembly to the OEDs.

Figure 5:
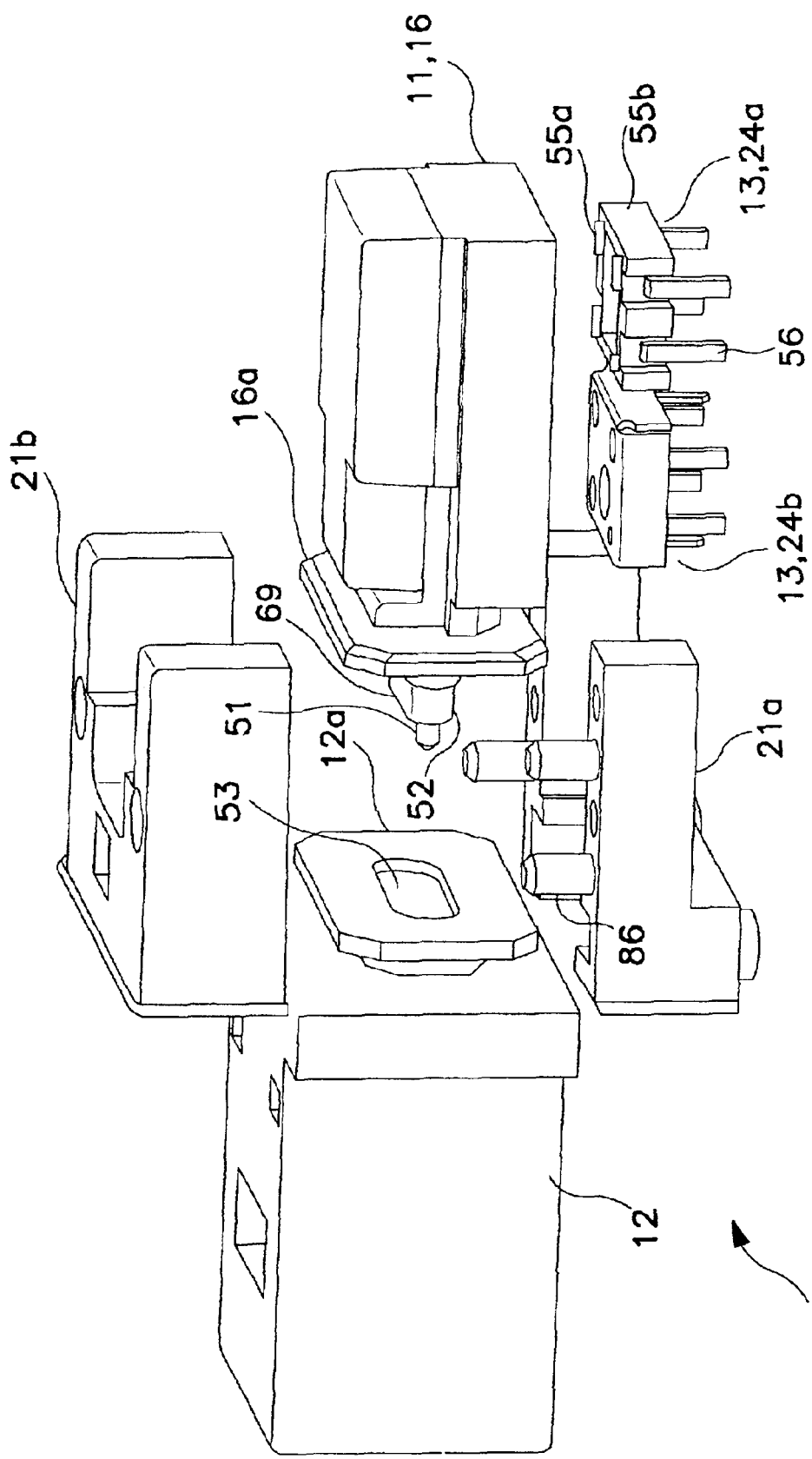
FIG. 5 shows an exploded view of the optically-aligned sub-assembly of the module of FIG. 1.

Referring to FIG. 5, an exploded view of the optically-aligned subassembly 50 is shown. Central to the optically-aligned subassembly 50 is the optical coupling 11, which is shown in its preferred embodiment as optical block 16. The optical block 16 is described below in detail with respect to FIGS. 6a through 6d. Connected to the optical block 16 are a number of other components including, the connector interface 12, clam shell connectors 21a, 21b to secure the connector interface 12 to the optical block 16, and optoelectric devices 13 operatively connected to the optical block 16.

Optical Block

FIGS. 6a through 6d show a preferred embodiment of the optical block 16 for a transceiver. The optical block 16 couples light between the multi-fiber array of a connector assembly and a plurality of OEDs 13 in a module. The optical block 16 preferably comprises a unitary structure of an optically-clear moldable material comprising at least the following features: (a) a plurality of first lenses 60a, 60b adapted for interfacing with a multi-fiber array of the connector assembly, each first lens 60a, 60b corresponding to a fiber in the multi-fiber array; (b) a plurality of second lenses 67a, 67b adapted to cooperate optically with the OEDs 13, wherein each second lens 67a, 67b corresponds to a first lens 60a, 60b; and (c) one or more reflective surfaces 15a, 15b. The first lenses 60a, 60b, the seconds lens 67a, 67b and the reflective surfaces 15a, 15b, respectively, are configured to provide two optical paths in the optical block, each optical path comprising a first section between a particular first lens and its corresponding reflective surface, and a second section between the reflective surface and the corresponding second lens. The first sections preferably are parallel.

The two optical paths defined by the optical block 16 pertain to a transmitting path and a receiving path since the optical block 16 is configured as a transceiver module. A detailed discussion of the lenses and reflective surfaces that effect these optical paths is set forth below, although it should be understood that the optical block of the present invention is not limited to just two optical paths nor is it limited to any particular combination of transmitting/receiving paths. For example, the optical block of the present invention can be configured to effect any combination of the optical paths described with respect to FIGS. 4(a)–4(h).

Lenses and Reflective Surfaces

The lenses and reflective surfaces of the optical block are configured to effect the optical paths of the present invention. Since the first lenses 60a, 60b preferably are arranged non-axially to the second lenses 67a, 67b, and, in the embodiment shown in FIG. 6, are arranged at substantially a 90° angle in the y,z plane, some kind of light bending mechanism preferably is used. According to preferred embodiments, the light bending mechanism comprises means for altering the direction of a substantial portion of the light emitted by the light emitting device such that a substantial portion of emitted light is received by the light receiving device. The particular structure of the light bending means may vary widely, depending upon such factors as the particular emitting and receiving device being coupled, the portion of the light whose direction is to be altered, and the relative positions of the OED and the x,y fiber array. In general, however, it is preferred that the light bending means comprises reflecting means in operative optical association with the OED and with the x,y array for reflecting at least a portion of light emitted by the light emitting device onto the light receiving device. It will be appreciated by those skilled in the art that numerous structures are capable of performing this function. For example, one or more reflective means disposed at the appropriate angle relative to the operative axis of the OED and the light transmission axis may be used to achieve this result. According to preferred embodiments described in more detail hereinafter, such reflective means comprises a reflective surface, such as a prism having an internal surface disposed at the appropriate angle with respect to the axes of the OED and the fiber optic transmission line. In order to minimize signal loss associated with the present coupling devices, it is preferred that the reflective means comprises a total internal reflection (TIR) prism. Since the path of light travel is reversible, the same light bending means may be used for embodiments in which the fiber optic transmission line is the light emitting device.

The same light bending means may also be used for multiple optical paths. More specifically, rather than using an individual reflective surface for each optical path, a single reflective surface may be used to bend a plurality of optical paths. Embodiments favoring the use of a single reflective surface for a plurality of optical paths include those in which the bending occurs at approximately the same location along the z axis so that the reflective surface may be a simple planer surface.

One skilled in the art will be able to assess the need for collimating the light beam in the optical path or otherwise focusing the beam depending on the divergence from the light source, which may be, for example, an OED, a fiber end of the multi-fiber array, or a surface of the optical block. For example, light emitted from the active area of an OED may be in the form of a beam of substantially parallel light rays centered on and substantially parallel to the operative axis of the device. In such embodiments, the need for lensing is minimal, and the optical block preferably comprises the light reflecting means positioned in the path of the beam with no collimating lens. On the other hand, the OED may be a light emitting device which produces a substantially divergent source of light, such as a VCSEL or the end of a fiber. In such embodiments, it is preferred that the optical block 16 include one or more collimating elements in operative optical association with the divergent light source. The principal purpose of the collimating element of the present invention is to reduce the degree of divergence of the rays emitted from the opto-electronic device or the fiber optic cable. Such a collimating element is preferably operatively associated with the light emitting source by aligning the optical axis of the lens with the operative axis of the light emitting device.

Since the collimating elements functions to focus divergent light form a divergent light source, it should be appreciated that one optical path may comprise a plurality of such elements. For example, in a typical optical path, where light is coupled between a fiber end and an OED, collimating elements may be disposed at the interface between the fiber end and the optical block, such an element is herein referred to as a "first lens", at the interface between the optical block and the OED, such an element is herein referred to as a "second lens", and at any point in between where the light encounters a surface interface, such as the cavity used to accommodate the reflective surface for feedback as described below.

The collimating element may comprise any device capable of focusing light from a divergent source. Preferably, the collimating element comprises an optical power surface, such as a positive, aspheric lens. The lens may be discrete from or integral to the optical block. In embodiments in which the lens is discrete from the optical block, the lens may or may not comprise the same material as the optical block. For example, the lens may comprise glass or a different grade of optically-clear plastic, and it may be coated according to known techniques. Preferably, however, the collimating elements is internally molded to the optical block. Such an embodiment is advantageous since the collimating element and optical block can be formed in a single molding operation. Furthermore, an integrally-molded lens avoids the need for assembly and the alignment steps therefor. Indeed, as mentioned above, a principal advantage of using an integrally-molded optical block is fixing in a single component many of the critical alignments along the optical path.

Feedback Mechanism

Another feature of the optical block is its ability to facilitate reflecting a sample of the light along the optical path as feedback for monitoring the output of one or more OEDs. Since the optical block defines the optical paths and transits the light along the path, it can be modified relatively easily to provide access along the optical path to sample a portion of the light beam on its way to being coupled to the fiber end. Furthermore, since the optical path preferably is molded with the critical alignments of the lensing and reflective surfaces, it can also be molded to facilitate means of diverting a portion of a beam along a particular optical path for a feedback sample.

The diverted sample portion can be coupled to the appropriate optical monitoring device which may be local to or remote from the light source. Preferably, the optical block is configured to reflect a portion of the light beam back to a monitor near the source such that the light bending means which are used to reflect the emitted beam from the source can be used also to reflect the feedback sample to the monitor. In embodiments where multiple sources use a common monitor, it may be preferable to sample a portion of each emitted beam and reflect each portion back to the common monitor. Optics used to collimate a plurality of sample beams are known. Alternatively, the feedback for a plurality of sources may be accomplished by sampling only a small number of representative beams.

Regardless of whether the sample beam is transmitted back to the OED source or to a remote monitor, it is preferable for the sample beam to be transmitted in substantially parallel planes along either the y,z or x,z planes in relation to the emitted beam. It has been found that by defining the optical paths in parallel planes in the optical block, a more robust and dimensionally-tolerant design is provided. As mentioned above, optical paths in parallel planes tend to be affected similarly upon a change or stress in the optical block. Furthermore, by maintaining the feedback and emitted beams in parallel y,z planes, a single reflective surface can be used.

The manner in which the optical block facilitates diverting a portion of a beam for feedback can vary depending upon the particular application. For example, the optical block can use splitters, partially-reflective surfaces, or similar devices. Such devices can be coated or otherwise configured to reflect or divert a portion of the light beam using known techniques. Such devices may be integrally-molded into the optical block or the optical block may define cavities to receive such devices. In a preferred embodiment, the optical block is molded with cavities adapted to receive a corresponding partially-reflective surface. This configuration is preferred since the reflective surface for the feedback preferably is different from that of the optical block. More preferably, the feedback reference surface comprises a planer glass piece which is coated such that only a portion of light is reflected. Such coating techniques are well known in the art. One skilled in the art will appreciate that suitable glass pieces can be manufactured in bulk relatively inexpensively.

EXAMPLE

Figure 7A:
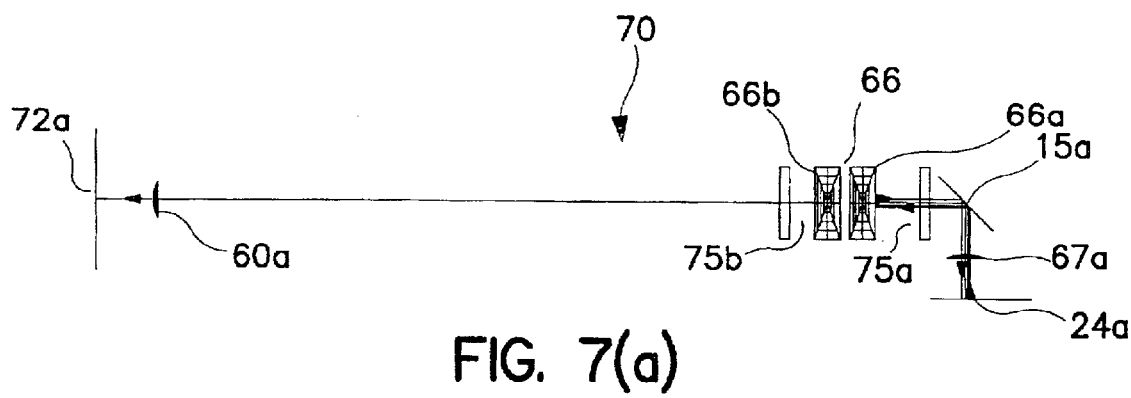
FIGS. 7(a)–(c) are ray diagrams of the specific optical paths defined in the optical block of FIG. 6.
Figure 7B:
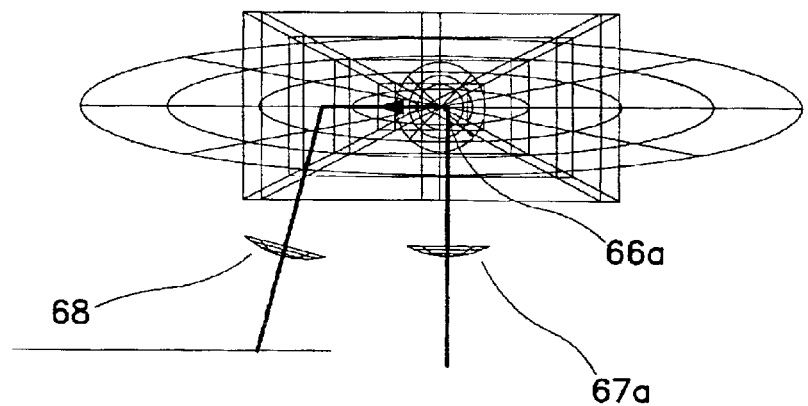
Figure 7C:
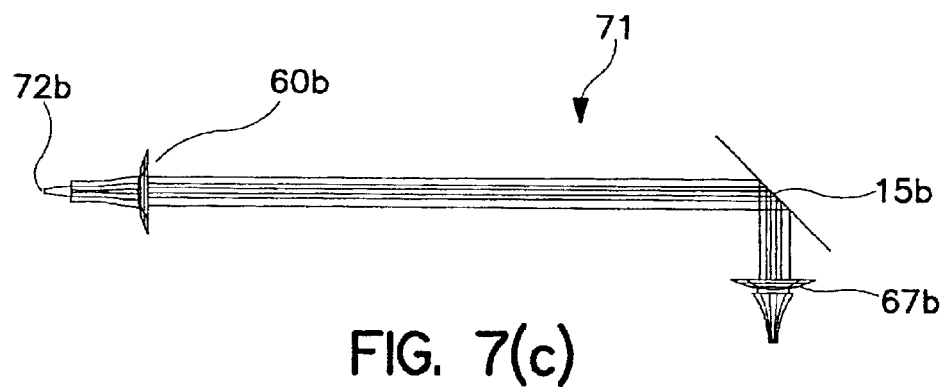

The optical block 16 of FIG. 6 and the optical paths it defines, including its feedback configuration, are described in particular detailed with respect to the ray tracing diagrams shown in FIGS. 7(a)–(c). It should be understood that optical block 16 and the optical paths defined therein are merely represented of the invention, and not exhaustive. For example, optical block 16 is used in a transceiver and defines two optical paths: one path couples optical signals from a fiber to a photodetector, while the other path couples optical signals from the OED to the fiber. Clearly, however, the present invention covers more than just two optical paths, and the optical paths can be used for propagating signals in either direction.

FIG. 7(a) shows the design concept of the transmitter. The light from a VCSEL on a lead frame 24a goes through a second lens 67a on its way to the coupled fiber. To accommodate the oxide VCSEL's large divergent angle, the optical lens 67a has a 1.4:1 magnification to reduce the numerical aperture (NA) on the fiber side to realize improved optical coupling. In this particular design, the lens surface was selected so that the optical paths inside the optical block travel parallel. The main reason for this is that the optical path is relatively long and plastic materials have rather high expansion coefficients. Hence, dimensional changes can be anticipated during thermal changes, and such dimensional changes will have a greater impact on longer optical paths. A parallel beam is more tolerant to temperature effect and manufacture errors.

From the second lens 67a, light is reflected almost 90° in the y,z plane by a total internal reflector (TIR) 15a. While it is contemplated that such an arrangement is generally preferred for the purposes of simplicity, manufacturing ease and efficiency, it will be appreciated that embodiments having other relationships between the light transmission axis and the operative axis are possible within the scope of the present invention Next, the light enters cavity 75a wherein an angled one-side-coated glass piece 66 is disposed. The glass surface 66a that is closer to the VCSEL is coated to reflect a certain amount of light. The amount of transmittal (or reflection) depends upon the specific needs of the laser and monitor. For example, in situations where the laser is operated at a high power output to ensure that its extinction ratio remains well above its lasing point, a greater amount of reflection is requires to "attenuate" the signal to its desired level. Likewise, the monitor's performance may be optimized if a certain amount of light is reflected. Typical transmittance values range from about 10 to about 60%. At the coating surface, part of the light is offset from its initial direction as it passes through the piece 66, and, upon exiting the piece 66 is offset at the surface to its initial direction. The light passes through the cavity 75b to the first lens 60a, where it is focused into a fiber, which, in this embodiment, is a multi-mode fiber.

With reference to FIG. 7(b), the feedback configuration is shown. At the coating surface 66a, part of the light is reflected back at an angle relative to the transmitted beam. The angle is controlled by the cavity 65 in the optical block which is adapted to receive the glass piece 66. As shown, the glass piece 66 is positioned to reflect light on substantially the same x,z-plane as the transmitted beam and slightly offset along the x-axis. This way, the reflected light is reflected again by the TIR surface 15a and is focused to a monitor diode by lens 68 to the side of lens 67a. The lens 68 is tilted to better accommodate the back-reflection light. This configuration is preferred since the absolute precision of the angle of the glass piece 66 is not critical. More specifically, by maintaining the reflected beam in the same x,z-plane as the transmitted beam, for the most part, only the x-axis alignment of lens 68 needs to be considered.

FIG. 7(c) shows the receiver optical path. This is relatively simple compared to the transmitter optical path. The receiver optical path uses a TIR mirror 15b and two lens surfaces 60b and 67b to couple light from fiber to receiver PIN diode. The receiver optical coupling tends to be more tolerant than transmitter coupling due to the large PIN size (e.g., 80 um diameter). The optical system is 1:1 system with both the receiver and fiber sides accommodating the mechanical dimension requirement.

Alignment—Optical Connector

In addition to housing the optical paths, optical block 16 preferably comprises other features to facilitate optical alignment along the optical path, including, for example, alignment interfaces with both the fiber assembly and the OEDs. With respect to the alignment interface with the fiber array, the optical block preferably comprises at least one alignment member to effect optical alignment with a connector assembly so as to align the first lenses with the fibers in a multi-fiber array of the connector assembly. Such an alignment member preferably provides for x,y alignment (z-alignment typically is achieved by intimate contact of interface surfaces as is known in the art).

The particular alignment member can vary, although suitable alignment members typically involve one component of cooperating structures, such as, for example, pins/ pegs and holes, splines shafts, mating beveled surfaces, and even cooperating magnetics. In a preferred embodiment, the alignment structure is one of either a pin or a pin receiving cavity adapted to receive the pin, and the cooperating structure on the connector assembly is the other of the pin or the pin receiving cavity. The alignment members may be integrally molded to the optical block or they be fitted to the optical block during post-molded assembly. Preferably, however, the alignment members are integrally molded to the optical block since the critical alignment between the first lenses and the pins can be set (i.e., molded) in a single operation.

In a preferred embodiment, the alignment structure comprises two integrally-molded pins which extend from an interface surface as defined in the MT connector standard. Although integrally-formed alignment members are preferred from an alignment and manufacturing standpoint, it is recognized that the pins will be formed of a plastic which is selected based on its optical properties and not on its strength properties. Consequently, the pins may present problems insofar as they are not at robust as alternative materials, such as metal, from which the pins or other alignment members could be formed albeit not integrally.

To overcome the strength limitations facing plastic pins, the preferred embodiment of the present invention employs a connector interface having rough-alignment means to align the cable connector sufficiently before mating with the pins to avoid impacting the pins so as to crush or shear them (see, e.g, FIG. 8a and associated text). Since the connector interface is preferably used to provide rough-alignment to the alignment members of the optical block, one or more alignment features are preferred to align the connector interface and the optical block. Such alignment features may include, for example, mating flanges, pins, posts, crush ribs, keys, etc.

Referring to FIG. 5, a preferred embodiment of the optical block and its alignment features are shown. The optical block 16 comprises an extension 52 containing the first ends of the optical paths along with pins 51. Extension 52 and flange 16a of the optical block are configured to cooperate with the connector interface 12. Specifically connector interface 12 comprises a corresponding mating flange 12a and defines an orifice 53 configured to receive extension 52. To provide alignment of the extension 52 and orifice 53 and to improve the interference fit therebetween, crush ribs 69 are provided on the extension 52.

Alignment—OED

In a preferred embodiment, the optical block 16 comprises one or more interfaces 61 for interengaging the OEDs 13. More preferably, the interface 61 provides for some measure of alignment of the OED. As shown in FIG. 6d, the interface 61 comprises a receptacle 62 which is configured to receive a lead frame. To this end, receptacle 62 is a substantially rectangular cavity having a mating surface 62b and side walls 62a to provide rough alignment of the lead frame as well as to provide a reservoir for potting the lead frame in place if desired. Receptacles 62 may be configured to receive interchangeable lead frames. In other words, preferably the interface between the optical block and the OED is standardized to receive either transmitters, receiver or other OEDs.

The OED interfaces may be configured with one or more reference or datum surfaces to provide for mechanical, passive alignment of the OED. In other words, rather than relying on active alignment to achieve the desired degree of alignment, certain mechanical stops can be used such that the OED is simply placed in the cavity. For example, if the distance from the second lens (e.g., 67a) and the mating surface 62b is controlled precisely and if OEDs, such as lead frames, are used in which the distance from the active surface of the laser (or detector) to the top surface 55a of the OED (or some other reference surface) is controlled, then the top surface 55a simply needs to be contacted with the mating surface 62b to achieve the proper alignment distance between second lens (e.g., 67a) and the active surface of the OED.

In addition to establishing the distance between the active surface of the OEDs and the second lenses, the OED interfaces may be configured to optically align the second lenses with the operative axis of the OED. For example, if the OEM is provided with a reference surface from its operative axis, such as side wall 55b of lead frame 24a, and the side wall 62a of the cavity is closely toleranced as a reference point from the operative axis of the second lens, then contact between the side wall 62a and the reference surface 55b would provide for mechanical passive alignment of the OED and second lens. Such alignment may be particularly preferred for OEDs with large active surfaces such as photodiodes and LED transmitters.

Manufacture of Optical Block

Preferably, the optical block 16 is uniformly formed by molding fluent plastic material into a precisely defined shape and configuration such that all of the optical path elements are set. A precision molding technique preferably is used such as injection molding. It will be appreciated by those skilled in the art that the tolerance limits between and among the various components of the optical coupling device are thus defined in accordance with a single molding operation. Accordingly, the use of such a single molding operation to produce the optical coupling device of the present invention substantially reduces the uncertainty and variability of the tolerance buildup associated with prior art devices.

The material of the optical block can vary, but preferably comprises optically-clear moldable plastic material such as polycarbonate, polyether-imide or polyarylsulfone. Such materials are commercially available from, for example, General Electric as UTEM™. The optical block may be molded using any well known technique, including, but not limited to, injection molding, compression molding or transfer molding. Preferably, injection molding is used.

Assembly Process

In addition to providing an optically-aligned subassembly which contains all critical optical alignments, improved optical alignment can be achieved by minimizing or reducing stresses imposed along the optical paths during the manufacturing process. As mentioned above, prior art manufacturing processes of optoelectric modules, frequently distort established optical alignments during the assembly process by imposing mechanical stresses on the various components which define the optical paths and optical alignments. Therefore, in a preferred embodiment of the present invention, an assembly process is used which minimizes the stresses imposed the optically-sensitive components.

In a preferred embodiment, the method comprises: (a) providing an optical assembly containing substantially all of the optical alignments from a cable assembly interface to at least one OED including the optical alignment of the OED; (b) assembling the module at least to the extend that a circuit board to which the OED is to be connected is held rigidly in relation to the optical assembly; and (c) after step (b), electrically connecting the OED to the circuit board.

Figure 8F:
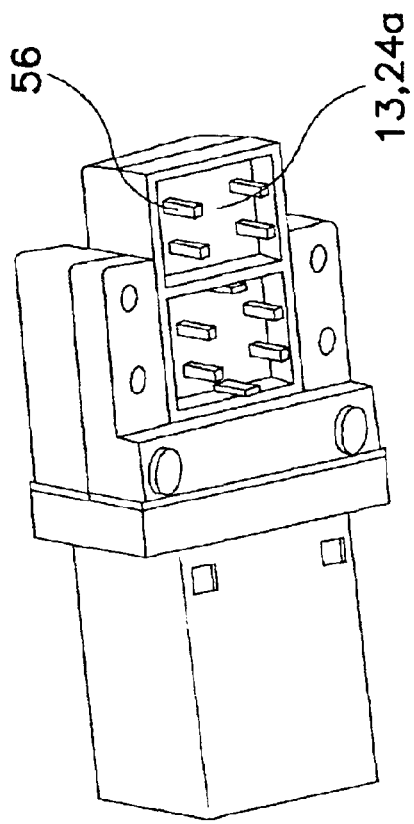
Figure 8H:
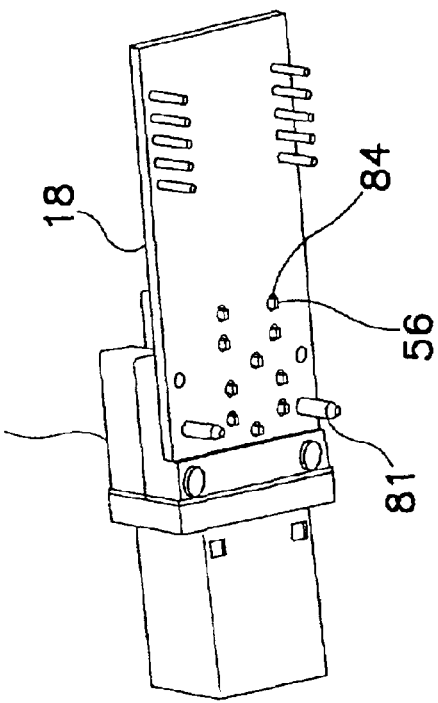
Figure 8E:
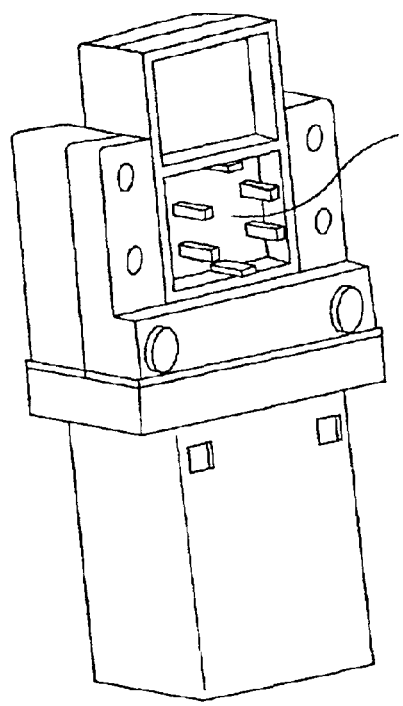
Figure 8G:
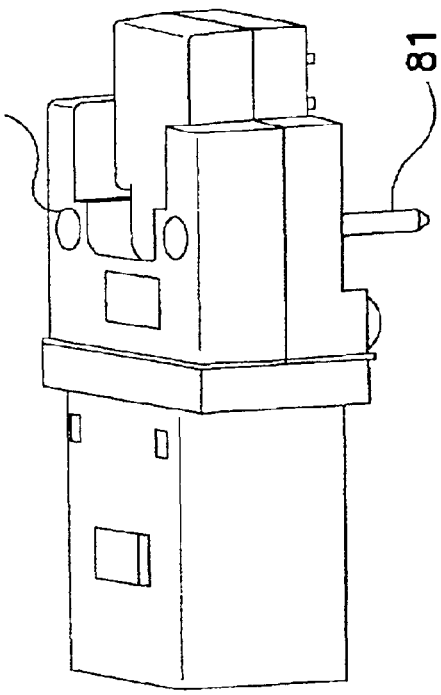
Figure 8J:
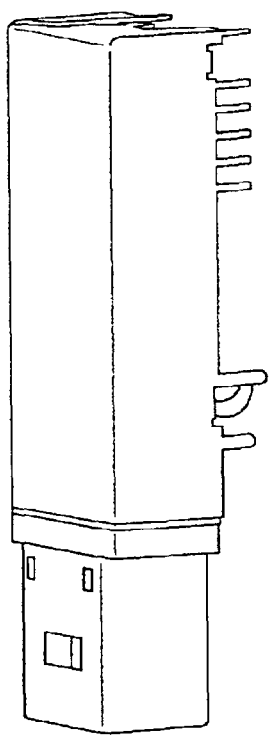
Figure 8L:
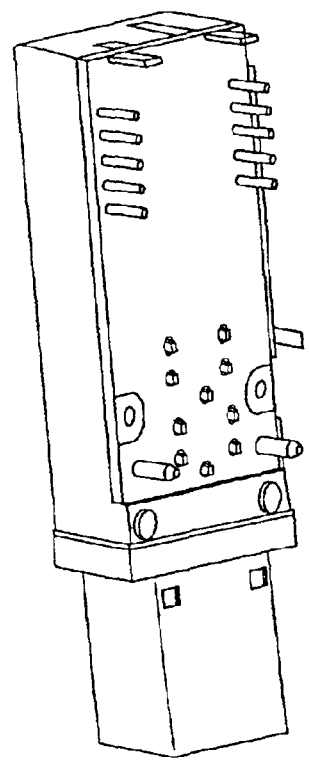
Figure 8I:
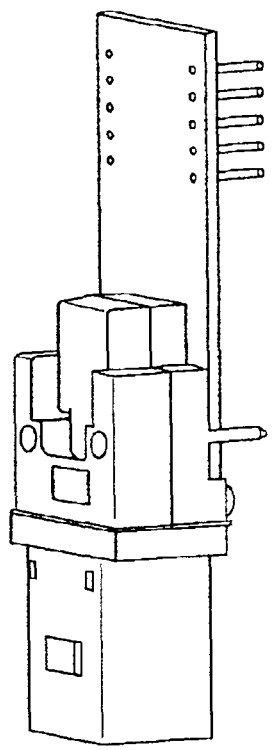
Figure 8K:
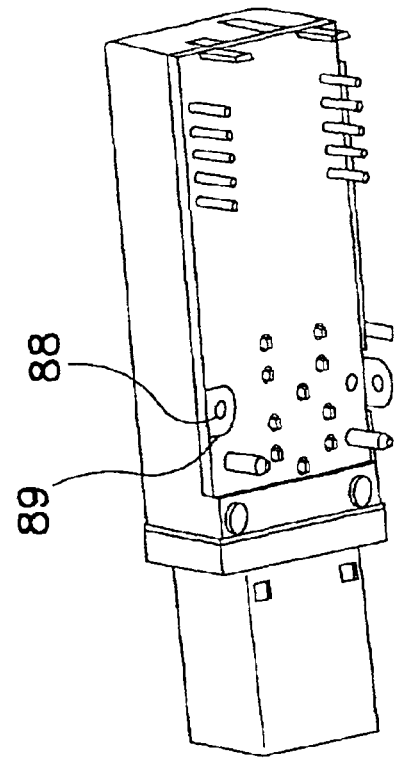
Figure 8N:
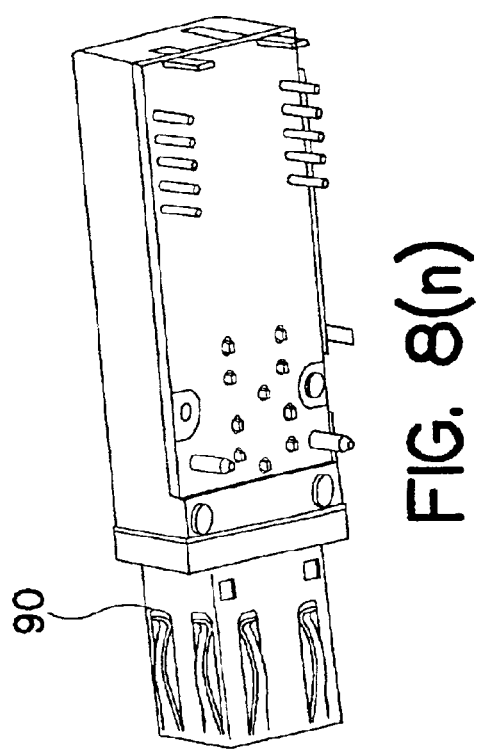
Figure 8M:
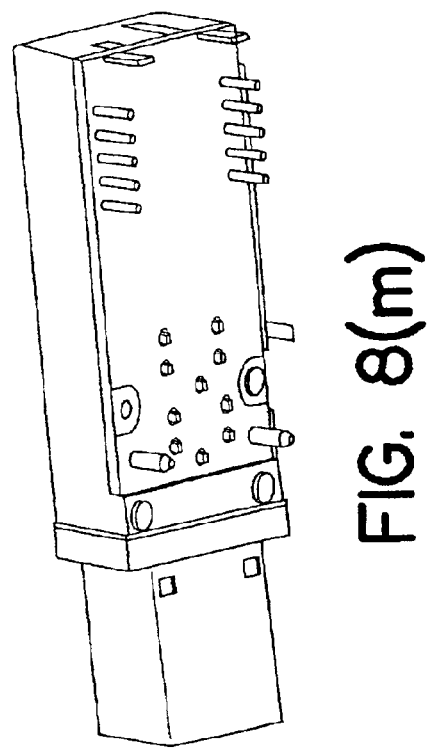

With reference to FIGS. 8a through 8n, an example of a preferred assembly method is described. An optical block is assembled to the extent that a feedback glass piece 66, if needed, is installed in the optical block, and a cover 11 is mounted thereto to seal the optical block from dust and other environmental hazards. Next, as shown in FIGS. 8a & b, the optical block 16 is coupled with connector interface 12 along their respective mating flanges 16a and 12a. With the flanges 16a and 12a mated, clamshell connectors 21a and 21b are snapped together. To this end, mating pins 86 are configured to interconnect the two clamshell connectors. Such mating pins are well known in the art.

It is important to mention that the clamshell connectors serve to tightly connect the optical block 16 to the connector interface, thus providing for a robust connection between the two components. Furthermore, as is evident in the later figures and associated text, the clamshell connectors serve as a focal point for all other substantial mechanical connections in the module. This way, most of the mechanical stresses imposed during the manufacture of the optically-aligned subassembly of the module and the module in general are directed through the clamshell connectors and not through optically-sensitive components such as the optical block 16.

After securing attaching the optical block 16 to the interface connector 12 using the clamshell connectors, the OEDs 13 are installed. In the preferred embodiment, as mentioned above, these OEDs are contained in lead frames 24a, 34b as shown in FIGS. 8e and 8f. If desired, the lead frames may be potted in the receptacles 62.

Following the installation of the OEDs 13, pins 81 are inserted through receiving orifices 83 in the clamshell connectors as shown in FIG. 8g. As shown in FIG. 8h, the pins 81 facilitate the connection of circuit board or substrate 18 to the clamshell connectors. More specifically, pins 81 are received in orifices 86 in the substrate 18 such that substrate 18 is aligned with the optical block 16 in such a way that the lead frame contacts 56, which extend from the lead frames 24a, 24b, are received in orifices 84.

It is worthwhile to mention that, at this point, the lead frame contacts 84 are not electrically connected to the substrate 18, but instead are free to move within orifices 24. In this way, substrate 18 can be flexed or otherwise manipulated with respect to the optical block 16 without inducing stresses on optical block 16 through the contacts 84 of the lead frames.

As shown in FIG. 8j, a cover 20 is then placed over the circuit board and, in this embodiment, over the optical block and a portion of the clamshell connectors. As shown in FIGS. 8k, and 8l, tabs 88 are bent around the bottom of the substrate 18, and pins 89 are inserted through tabs 88, cooperating orifices in the substrate, and through cooperating channels in the clamshell halves. In FIG. 8n, and EMI shield 90 is slipped over the connector interface 12 to complete the mechanical assembly of module 10.

Finally, contacts 24a from lead frames 24 are electrically connected to the substrate 18 using solder or equivalent electrical-connection technique. This way, connection of the sensitive components of the optically-aligned subassembly are delayed until the final steps to avoid inducing stress therein. The module is now ready to be installed in a host system.

What is claimed is:

1. An opto-electric module having x, y, and z axes, said module comprising:
   a connector interface adapted to interconnect with a multi-fiber assembly having an x,y array of fibers;
   a plurality of OEDs for converting between optical and electrical signals; and optical paths wherein each optical path has a first end adapted for optically coupling with a corresponding fiber in the x,y array of a multi-fiber assembly interconnected with said connector interface, and a second end for optically coupling with a corresponding OED, wherein the distance between the second ends of at least two optical paths is greater than the distance between their corresponding first ends and wherein the distance across the second ends along the x-axis is no greater than the distance across the first ends along the x-axis.

2. The module of claim 1, wherein each optical path comprises a first section which includes said first end and is parallel to the z-axis, and a second section which includes said second end, wherein said first and second sections are not coaxial.

3. The module of claim 2, wherein said second sections are not parallel to the z-axis.

4. The module of claim 3, wherein a portion of said second sections are substantially perpendicular to the z-axis.

5. The module of claim 4, wherein said first ends are arranged along the x,y axes in the same spacial relationship as the x,y array of a multi-fiber assembly, and wherein the arrangement of first ends is elongated along the x-axis.

6. The module of claim 5, wherein said second sections are substantially parallel to the y-axis.

7. The module of claim 6, wherein said second sections are substantially perpendicular to the x-axis.

8. The module of claim 1, wherein (a) the distance along the y-axis between said at least two second ends is greater than the distance along the y-axis of their corresponding first ends, or (b) said at least two second ends are separated by a certain distance along the z-axis, or a combination of (a) and (b) above.

9. The module of claim 8, wherein the OEDs corresponding to said at least two second ends are spaced along the z-axis.

10. The module of claim 1, wherein said optical paths are defined in a unitary optical block.

11. The module of claim 10, wherein said optical block comprises an injection-moldable material.

12. The module of claim 11, wherein said unitary optical block comprising at least:
an x,y array of first lenses at said first ends of said optical paths and adapted to couple optically with the x,y array of a multi-fiber assembly;
second lenses at said second ends of said optical paths, said second lenses being adapted to cooperate optically with said OEDs, each second lens corresponding to a first lens; and
at least one reflective surface along each optical path for changing the direction of light propagating therein.

13. The module of claim 12, wherein said optical block further comprises a second reflective surface along an optical path to redirect a portion of light propagating therein for feedback information.

14. The module of claim 13, wherein said optical block comprises an OED interface.

15. The module of claim 14, wherein said OED interface is a cavity.

16. The module of claim 15, wherein said OED is a lead frame and said OED interface is a cavity adapted to receive said lead frame.

17. The module of claim 14, wherein each OED interface is discrete.

18. The module of claim 1, wherein said module further comprises circuitry to electrically connect said OED to a host system in which said module is installed.

19. The module of claim 1, further comprising a host system in combination with said module.

20. The module of claim 19, wherein said host system is a router.

21. An optical subassembly of all critical optical alignments, said optical subassembly comprising:
a unitary structure of an optically-clear moldable material comprising at least the following features:
a plurality of first lenses adapted for interfacing with a multi-fiber array of a connector assembly, each first lens corresponding to a fiber in said multi-fiber array;
a plurality of second lenses adapted to cooperate optically with said OEDs, wherein each second lens is optically coupled to a first lens along an optical path to define said plurality of optical paths;
at least one reflective surface disposed along one or more optical paths to alter the direction of said optical paths, wherein said optical paths are parallel between said first lens and said reflective surface;
a plurality of OED receptacles for receiving said OEDs, each OED receptacle including one of said second lenses; and
at least one alignment member for aligning each fiber end of a multi-fiber array with a first lens; and
a plurality of OEDs mounted in said OED receptacles, each OED being optically coupled to one of said second lenses.

22. The optical subassembly of claim 21, wherein said alignment member provides for x,y alignment.

23. The optical subassembly of claim 22, wherein said alignment member is a structure which is adapted to cooperate with a corresponding structure on a mating cable assembly.

24. The optical subassembly of claim 23, wherein said alignment structure is one of a pin or a pin receiving cavity adapted to receive said pin, and wherein said cooperating structure is the other of said pin or said pin receiving cavity.

25. The optical subassembly of claim 21, wherein said first lens are located on an interface surface and said alignment member comprises pins extending from said interface surface, said pins being configured on said interface surface to cooperate with receiving pin cavities on said fiber assembly.

26. The optical subassembly of claim 25, wherein said pins are integrally molded to said optical block.

27. The optical subassembly of claim 21, wherein said alignment member comprises a mating flange adapted for mating with a corresponding flange of a connector interface which is adapted to interengage a connector assembly.

28. The optical subassembly of claim 27, wherein further comprising a connector portion connected to said mating flange and adapted to receive a fiber assembly, said connector portion comprising a housing defining an opening and a receiving cavity to receive the cable assembly and guides extending from said housing into said receiving cavity, said guides being adapted to guide the fiber assembly into at least proximate alignment with said first lens of said optical block.

29. The optical subassembly of claim 21, wherein said first lenses are located on an interface surface that extends from said optical block, said alignment member further comprises pins extending from said interface, said housing of said connector interface defining a second opening to receive said interface surface.

30. The optical subassembly of claim 21, wherein said receptacle defines a cavity dimensionally configured to receive at least a portion of an OED.

31. The optical subassembly of claim 30, wherein said cavity is adapted to receive a lead frame and said OEDs are lead frames.

32. The optical subassembly of claim 31, wherein said cavity has a reference surface a certain distance from its second lens to contact a cooperating surface on said lead frame to provide for alignment.

33. The optical subassembly of claim 32, wherein said cavity is provided with stops that are configured to contact a lead frame when said lead frame is aligned within said cavity.

34. The optical subassembly of claim 33, wherein said OED receptacles are standardized to a particular lead frame configuration, said lead frame configuration being adapted to support lasers, LEDs, photodiodes or detectors.

35. The optical subassembly of claim 21, wherein said OEDs are mounted on lead frames.

36. An optical block, said optical subassembly comprising:
    a unitary structure of an optically-clear moldable material comprising at least the following features:
        a plurality of first lenses adapted for interfacing with a multi-fiber array of a connector assembly, each first lens corresponding to a fiber in said multi-fiber array;
        a plurality of second lenses adapted to cooperate optically with said OEDs, wherein each second lens is optically coupled to a first lens along an optical path to define said plurality of optical paths; and
        at least one reflective surface disposed along one or more optical paths to alter the direction of said optical paths, wherein said optical paths are parallel between said first lens and said reflective surface, and wherein the distance between adjacent second lens is greater than the distance between their corresponding first lenses and wherein the distance across the second lenses along the x-axis is no greater than the distance across the first lenses along the x-axis.

37. An opto-electric module having x, y, and z axes, said module comprising:
    a connector interface adapted to interconnect with a multi-fiber assembly having an x,y array of fibers;
    a plurality of opto-electric devices (OEDs) for converting between optical and electrical signals; and
    an optical block comprising a unitary structure of an optically-clear moldable material comprising at least the following features:
        a plurality of first lenses adapted for interfacing with a multi-fiber array of said connector assembly, each first lens corresponding to a fiber in said multi-fiber array;
        a plurality of second lenses adapted to cooperate optically with said OEDs, wherein each second lens corresponds to a first lens and is not coaxial with said first lens;
        at least one alignment member for aligning each fiber end of a multi-fiber array with a first lens;
        a plurality of OED receptacles for receiving said OEDs, each OED receptacle including one of said second lenses;
        one or more reflective surfaces;
        wherein said first lenses, said seconds lens and said reflective surfaces are configured to provide a plurality of optical paths in said optical block, each optical path comprising a first section between a particular first lens and a reflective surface and a second section between a corresponding second lens and said reflective surface, wherein said first sections are parallel.

38. The optical subassembly of claim 37, wherein said OEDs are mounted on lead frames.

39. A feedback mechanism for use in parallel optics, said feedback mechanism comprising:
    an optical assembly defining a plurality of optical paths, at least one of said optical paths being a transmitting optical path which extends from a light-emitting component of an OED to a cable assembly interface; and
    at least one partially-reflective surface disposed across said transmitting optical path to reflect a portion of light transmitted by said light-emitting OED, wherein said partially-reflective surface is at an angle to said transmitting optical path such that the optical path of the reflected portion of light is not coaxial to said transmitting optical path and is incident upon a monitor for controlling the output of said light-emitting OED.

40. The feedback mechanism of claim 39, wherein said optical assembly is a unitary structure of an optically-clear moldable material comprising at least the following features:
    a plurality of first lenses adapted for interfacing with a multi-fiber array of a connector assembly, each first lens corresponding to a fiber in said multi-fiber array;
    a plurality of second lenses adapted to cooperate optically with said OEDs, wherein each second lens is optically coupled to a first lens along an optical path to define said plurality of optical paths; and
    wherein one of said optical paths is said transmitting optical path.

41. The feedback mechanism of claim 40, wherein said unitary structure has a cavity for receiving said partially-reflective surface.

42. The feedback mechanism of claim 41, wherein said partially-reflective surface is a piece of coated flat glass.

43. The feedback mechanism of claim 40, wherein said OED is a lead frame, and said light emitting component and said monitor are mounted on said lead frame.

44. The feedback mechanism of claim 40, wherein said unitary structure comprises at least one reflective surface disposed along said transmitting optical path to alter the direction of said transmitting optical path, wherein said transmitting optical path comprises a first section between its first lens and said reflective surface and a second section between said reflective surface and its second lens.

45. The feedback mechanism of claim 44, wherein a cavity is disposed along said first section and is angled such said optical path of said reflected portion of light is substantially along the same x,y-plane as said transmitting optical path.

46. The feedback mechanism of claim 45, wherein said unitary structure comprises a feedback lens adjacent said second lens for focusing said portion of reflected portion on said monitor.

* * * * *